Sept. 6, 1960 R. L. BOYLES 2,951,919

TIME SWITCH

Filed May 31, 1956 3 Sheets-Sheet 1

Inventor:
Robert L. Boyles,
by Lawrence R. Kempton
His Attorney.

Inventor:
Robert L. Boyles,
by Laurence R. Kempton
His Attorney.

Sept. 6, 1960 R. L. BOYLES 2,951,919

TIME SWITCH

Filed May 31, 1956 3 Sheets-Sheet 3

Inventor:
Robert L. Boyles,
by Laurence R. Kempton
His Attorney

United States Patent Office 2,951,919
Patented Sept. 6, 1960

2,951,919

TIME SWITCH

Robert L. Boyles, Wayland, Mass., assignor to General Electric Company, a corporation of New York Filed May 31, 1956, Ser. No. 588,435

19 Claims. (Cl. 200—38)

This invention relates to time controlled devices, and more particularly to switch means actuated as a function of time.

For example, it is found desirable to control apparatus such as a television receiver so that operation of the receiver will be automatically commenced at a particular preset time and the receiver will remain in operation for a preset time interval so that a particular program may be viewed, for example, and then automatically turned off at the end of such time interval, it being highly desirable that timers for television receivers be provided with simplified control devices so that a viewer can set the receiver for automatic operation under the control of the timer without becoming involved in a series of complicated calculations to arrive at a particular setting he desires. It is also found desirable to be able to manually start or turn off such a television receiver at any time.

Accordingly, it is a primary object of this invention to provide an improved time switch for television receivers and the like which may be preset to automatically start the receiver at a preselected time and to automatically control a viewing interval of preselected duration.

It is another object of this invention to provide a time switch means for television receivers and the like which has separate indicators and independent setting means therefor for indicating a preselected start time and for directly and separately indicating a preselected viewing time interval.

A further object of this invention is to provide a single manually adjustable device for preselecting the length of viewing time, and for opening and closing the switch manually.

It is a further object of this invention to provide accurate timing means including preconditioning means for closing the switch at exact timed intervals.

In accordance with one aspect of this invention, a time switch comprising a timing device is provided with manually presettable start time means continuously operated by said timing device for closing the switch at a preselected time. A manually presettable view time means is provided for maintaining the switch closed for a preselected adjustable time interval. The manually presettable view time means is not continuously operated by the timing device but is provided with an idler gear for selectively connecting the view time means for operation by the timing device. Automatic means is provided for connecting the idler gear for rotation by the timing device when the manually presettable start time means closes the switch. Thereafter, the timing device rotates the idler gear, thereby driving the manually presettable view time means back to zero to open the switch. By this arrangement, a simplified yet effective automatic time controlled device is achieved.

In accordance with a further aspect of this invention, the manually presettable start time means for closing the switch is provided with means for closing the switch at exact short timed intervals. For example, since most television programs begin on the hour, half hour, fifteen minutes before the hour, or fifteen minutes after the hour, it is desirable to start the television at exact fifteen minute intervals. This means for actuating the switch to a closed position at exact short timed intervals may comprise a switch actuation slider. Spring means may be provided for slidably urging the slider in a direction for closing the switch. Latch means is formed on the slider for locking the slider in one position to hold the switch open against the force of the spring means. A first timed means is driven at a relatively high rotational speed by the timing mechanism for disengaging the latch means at particular times (at fifteen minute intervals, for example), when the slider is placed in the path of the first timed means. A second presettable timed means is provided for normally holding the slider out of the path of the first timed means and for allowing the slider to move into the path of the first timed means at a preset time. Thus, the second timed means preconditions the first timed means to select the proper short timed interval in which the first timed means is to operate to disengage the latch means. The second timed means is driven at a fraction of the speed of said first timed means and allows the slider to pivot into the path of the first timed means for actuation thereby. The first timed means may include a cam directly connected to the minute hand shaft of a clock for rotation at the same speed thereas.

Further objects and advantages of my invention as well as other modifications and uses thereof will become apparent as the description proceeds. My invention will be better understood by reference to the accompanying drawings in which.

Figure 1:
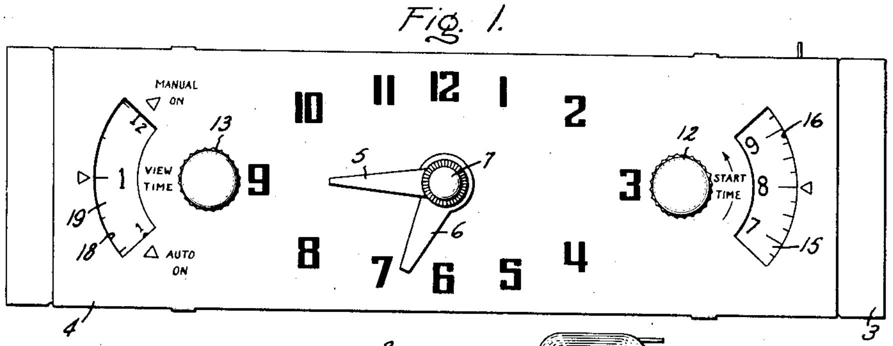
Fig. 1 is a front elevation view of a time switch constructed in accordance with this invention and which is particularly adapted for use with a television receiver for automatically controlling the television receiver at preselected future times.

Referring now to the drawing, and first, particularly to Fig. 1, the time controlled device of this invention is shown as comprising a generally elongated rectangular casing 1 suitable for mounting in any desired manner on a television receiver (not shown). This mechanism comprises a rear plate 2 and a front plate 3 upon which is mounted a dial plate 4 having the usual clock numerals painted or otherwise centrally placed thereon. The clock is provided with minute and hour hands 5 and 6, respectively, mounted for movement over the dial and driven by a conventional timing device gear train. The clock may be set by means of a conventional knob 7. The timing device may include any suitable form of timer motor here shown as a self-starting synchronous motor 8, the field coil 9 of which is connected to a source of regulated frequency alternating current. A terminal shaft 10 including a gear 11 fixed thereto extends through rear plate 2 for driving the minute and hour hands of the clock, the start time mechanism, and the view time mechanism in a manner to be more fully described hereinafter.

Figure 2:
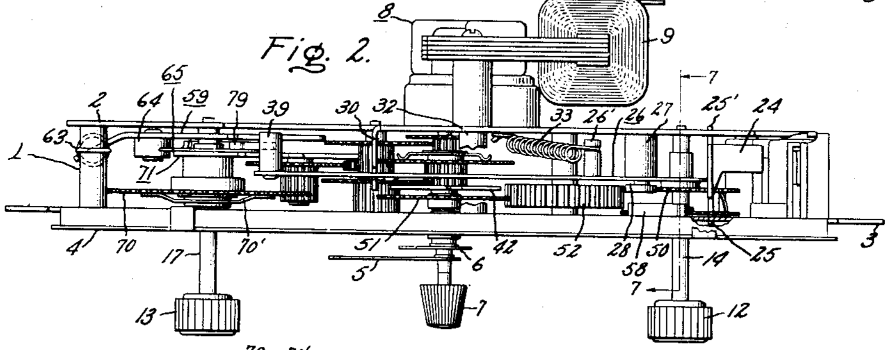
Fig. 2 is a top plan view of the time switch shown in Fig. 1.
Figures 9, 10:
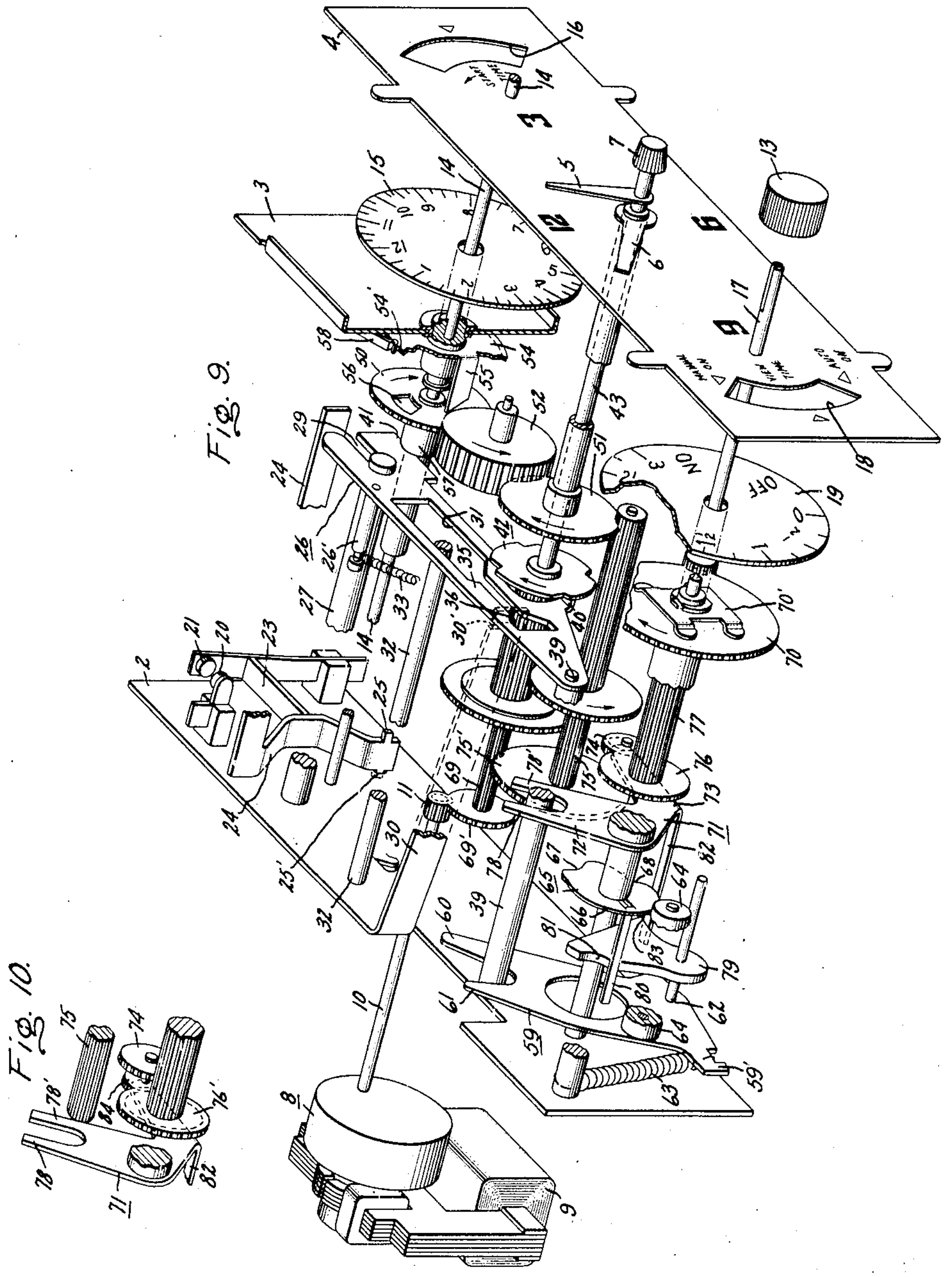
Fig. 9 is an exploded perspective view of the operating mechanism of the time switch showing the start time mechanism at a particular preset start time, the view time mechanism at a particular preset view time, and the switch in an open position ready to be actuated to a closed position by the start time mechanism.
Fig. 10 is a perspective view of a modified view time gear train.

As shown in Figs. 1, 2 and 9, manually operable control knobs 12 and 13 are provided for controlling the time switch. The right-hand control knob 12 is connected to a setting shaft 14 for rotatably setting an hours number disc 15 visible through window 16 formed in dial plate 4. Disc 15 is fixed to shaft 14. The visible indication on number disc 15 indicates the time at which it is desired to start the television set. This may be identified by suitable indicia such as "start time" printed on the face of plate 4 adjacent window 16.

The left-hand control knob 13 is connected to a view time setting shaft 17 for rotatably setting an hours number disc 19 readily visible through window 18 formed in dial plate 4. Disc 19 is fixed to shaft 17. Suitable indicia are provided on disc 19 for indicating a preselected view time interval. This may be identified by suitable terminology such as "view time" imprinted on the face of plate 4 adjacent window 18. Knob 13 is also provided for manually turning the television receiver on and off. Hence, suitable indicia such as "On" and "Off" are also provided on number disc 19. When knob 13 is manipulated to rotate wheel 19 to the desired "on," "off" or "view time" indication, other elements of the time switch mechanism are set or actuated in a manner to be described later.

The actuation of knob 13 for turning the television receiver on will now be described. When knob 13 is rotated clockwise to a particular view time indication, the television receiver will be immediately turned on and will stay on for the period indicated on the view time number disc 19. On the other hand, should the "view time" disc 19 be rotated through the "off" position counterclockwise to indicate a particular view time period, the television receiver will not be turned on immediately but will be automatically turned on at the time indicated by the "start time" wheel 15 and will remain on for the period indicated by the view time disc 19. Accordingly, an arrow pointing in a counterclockwise direction along with suitable indicia such as "Auto-On" is imprinted on the face of dial 4 at the bottom of window 18, and suitable indicia such as "Manual On" along with an arrow pointing in a clockwise direction may be imprinted above window 18 on dial plate 4.

A general description of the timing device and the operation of its various components may be best understood with reference to Fig. 9, wherein the elements are diagrammatically shown in an exploded view. The switch which is included in the timing mechanism, is formed by contacts 20 and 21 normally biased to a closed position by the resiliency of contact member 21. An insulated plate 23 is provided for moving resilient contact 21 to open the switch. A switch operating lever 24 is pivoted at 25 and 25' to front and rear supporting plates 3 and 2, respectively, for co-operating with insulated plate 23 to actuate contact 21.

A generally rectangular elongated slider 26 is provided for moving switch operating lever 24 to open the switch and forms a unique interconnecting link between many of the elements of the timing device in a manner to be more fully described hereinafter. I provide means for supporting slider 26 on rear plate 2 of the timing device. In the arrangement illustrated, a lug 27 is fixed to rear plate 2 and the right end of slider 26 is provided with a slot 29 for receiving lug 27. As more particularly shown in Fig. 8, a circumferential groove 28 is formed in lug 27 for laterally guiding slider 26 and for allowing slider 26 to pivot and slide on lug 27. A portion of rear plate 2 may be cut and inwardly bent to form an arm 30 for supporting the left end of slider 26. Arm 30 may be formed with a slot 30' for laterally guiding slider 26 in a manner similar to groove 28. An enlarged opening 31 may be formed in slider 26 to provide clearance for a spacing post 32 fixed between front plate 3 and rear plate 2.

Figure 3:
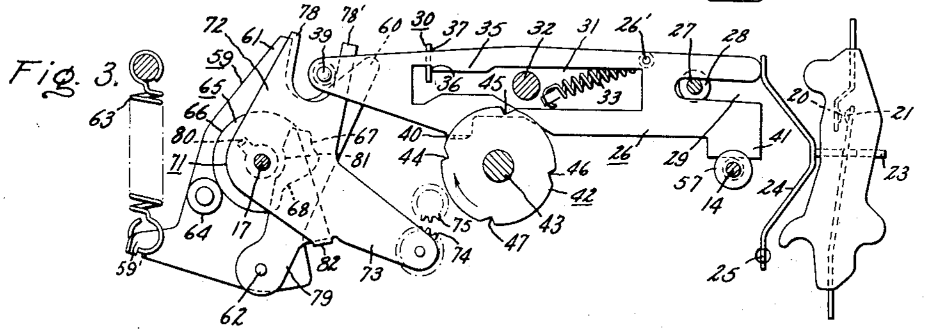
Fig. 3 is a partial front elevation view of the time switch showing the switch in an open position with the start time mechanism in a preselected start time position and the viewing time mechanism in a preselected viewing time position.
Figure 8:
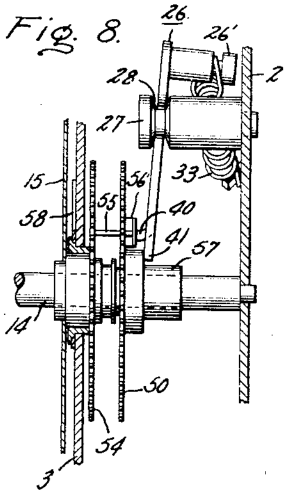
Fig. 8 is an enlarged fragmentary view in cross section taken in the plane represented by the line 7—7 of Fig. 2 showing the start time mechanism in a different operative position.

As shown in Fig. 3, a tension spring 33 is provided for urging slider 26 to the left in a direction for closing switch 20, 21, for pivoting the top portion of slider 26 about lug 27 and extension 30 to move the bottom portion of slider 26 forwardly, and for pivoting slider 26 about lug 27 to urge the left part of slider 26 downwardly. As shown in Fig. 8, one end of spring 33 is fixed to a lug 26' fixed to slider 26, and the other end of spring 33 is fixed to rear plate 2.

My improved switch actuation slider includes latch means for normally holding the switch in an open position against the force of resilient switch contact 21 and tension spring 33. As viewed in Fig. 3, enlarged opening 31 is formed to include a downwardly extending projection 35 having an edge 36 extending approximately perpendicular to the upper longitudinal edge of enlarged opening 31 to thereby provide latch means. In the position shown in Fig. 3, edge 36 abuts a side portion 37 of arm 30 and the latch is engaged to hold the switch contact 21 open. In this position, resilient contact 21 acting through pivoted lever 24, and spring 33 acting through lug 26' urge edge 36 of the latch against the side portion 37 of arm 30.

Separate means are provided for disengaging latch 35 to open the switch. In the arrangement illustrated, stud 39 is fixed to the leftmost portion of slider 26 for allowing the left end of the slider to be raised to disengage the latch 35. Other latch disengaging means includes a forwardly bent tab 40 provided on the bottom portion of the slider 26 for also allowing slider to be lifted in a manner to be more fully described hereinafter. When the slider 26 is lifted against the force of spring 33 by means engaging lug 39 or tab 40, slider 26 is pivoted about lug 27 and edge 36 is lifted above side surface 37, thus releasing the latch and allowing spring 33 to move the slider to the left to the position shown in Fig. 4. In this position, contact 21 is unrestrained and moves to the left as viewed in Fig. 4 against contact 20 to thereby close the switch.

*Start time mechanism*

When the viewing time knob 13 is rotated counterclockwise from the manual "off" position, the start time mechanism will cause slider 26 to be tripped and the switch to be closed at exactly the quarter hour indicated in the start time window 16. The viewing time mechanism will be more fully described hereinafter and for the purposes of this discussion, it may be assumed that lug 39 which cooperates with the viewing time mechanism is free to move in any direction.

My improved start time mechanism for tripping slider 26 and releasing latch 35 at the exact hour, half-hour, fifteen minutes before the hour or fifteen minutes after the hour as indicated on start time wheel 15 will now be more particularly described. As shown in Figs. 3 and 9, minute hand 5 is fixed to shaft 43 and is driven thereby. A cam disc 42 is also rigidly fixed to minute hand shaft 43 and rotates therewith at one revolution per hour. Four equally spaced circumferentially arranged notches 44, 45, 46 and 47 are formed in disc 42. When one of these notches engages tab 40 formed on slider 26, continued rotation of disc 42 raises the left-hand end of slider 26. A motion of approximately one thirty-second of an inch is sufficient to trip slider 26 to the "on" position shown in Fig. 4.

Figure 4:
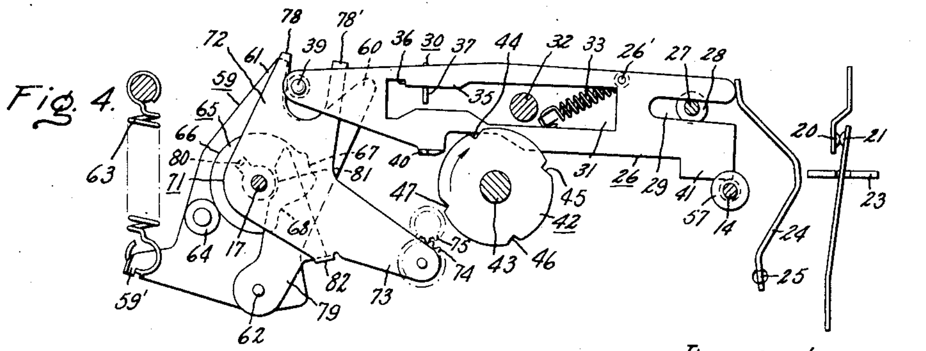
Fig. 4 is a partial front elevation view showing the time switch in a different operative position with the switch closed and the viewing time mechanism connected to the timing mechanism for maintaining the switch closed for a preset viewing time.

During manufacture, the minute hand 5 is accurately fixed to minute hand shaft 43 at a particular angular position with respect to notches 44, 45 and 46 such that at the instant one of the notches trips the slider 26 to the "on" position shown in Fig. 4, minute hand 5 will be pointing to 12, 3, 6 or 9. Thus, a unique and simple accurate timing mechanism which specifically relates start time to the time of day indicated by the clock is provided. There are two conditions that must be met before tab 40 may engage one of the notches 44, 45, 46 or 47. The viewing time knob 13 must be rotated counterclockwise to show some desired view time. This allows slider tab 40 to move to the left from the position shown in Fig. 5 to the position shown in Fig. 3 with latch 35 engaged. As shown in Fig. 3, tab 40 rides on a radially outward side surface of disc 42 so that it can be picked up by one of the notches in disc 42. However, in the position shown in Fig. 5, a portion of tab 40 rides on a side surface of disc 42 which has a shorter radius than a circular line connecting notches 44, 45, 46 and 47, and this prevents tab 40 from dropping into any of the notches. The viewing time mechanism will be more fully described hereinafter.

Whether or not tab 40 on slider 26 engages one of notches 44, 45, 46 or 47 on the fifteen minute cam 42, is also determined by a preconditioning mechanism which allows the slider 26 to pivot about lug 27 and arm 30 so that the bottom thereof moves forwardly toward disc 42, thus allowing tab 40 to engage a side peripheral surface of cam 42. In the arrangement illustrated, the preconditioning means cooperates with a downwardly extending tab 41 formed on the bottom right side of slider 26.

Figure 7:
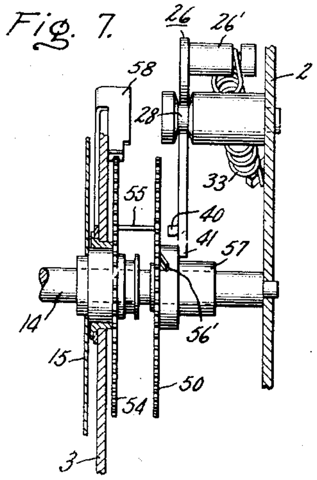
Fig. 7 is an enlarged fragmentary view in partial cross section taken in the plane represented by the line 7—7 of Fig. 2 showing the start time mechanism in one operative position.

Referring now to Figs. 7, 8 and 9, my improved preconditioning mechanism will now be more particularly described. This mechanism includes a gear 50 which is driven in the direction shown by the timing mechanism at one revolution in twelve hours. Gear 50 is geared to an hour hand gear 51 through gear 52 and rotates with it at the same rate, and when the hour hand 6 is set by knob 7, the gear 50 is likewise set. Hour hand gear 51 may be connected to the timing mechanism and the hour hand 6 in a manner well known in the art.

On the same axis of rotation with gear 50 is a start time setting gear wheel 54 which is normally stationary but which is fixed to a setting shaft 14 by means of which gear 54 may be rotatably set in any desired position, such position being indicated by wheel 15 which is also fixed to shaft 14, as previously described. The gears 50 and 54 form a start time preconditioning cam means. Thus, gear 54 has a cam-shaped part 55 on one side thereof extending toward gear 50, which cam part 55 normally rides on the adjacent surface of gear 50 as the latter rotates. Gear 50 has a cam slot 56 in it on the same radius as cam part 55, such that when slot 56 has rotated into axial alignment with cam part 55, the latter may and will enter the slot 56 accompanied by an axial forward movement of gear 50 and hub 57 to which gear 50 is rigidly affixed, as viewed in Fig. 9. This axial movement is permitted by reason of the hub 57 and the gear 50 secured thereto being axially movable on shaft 14, and is caused by tension spring 33 which is fixed to the upper portion of slider 26 to pivot the slider and urge the downwardly extending tab 41 thereof forward against an end portion of hub 57. When hub 57 and gear 50 which is rigidly fixed thereto move axially forward and slider 26 is pivoted about lug 27 and arm 30, as shown in Fig. 8, tab 40 engages a side surface of disc 42 for allowing cam disc 42 to actuate slider 26 in a manner previously described. I provide means for pivoting the bottom portion of slider 26 rearwardly to remove tab 40 from the side surface of disc 42 after disc 42 has lifted the left portion of the slider 26 to disengage the latch 35. In the arrangement illustrated, the slot 56 of gear 50 as viewed in Fig. 8, is provided with an inclined lip 56′ punched out of disc gear 50, and cam extension 55 is provided with an inclined end portion so that after cam finger 55 has entered slot 56 it will ride out again by reason of the normal clock rotation of gear 50 and push gear 50, hub 57 and tab 41 rearwardly against the tension of spring 33 to the position shown in Fig. 7.

The start time setting mechanism is provided with a detent comprising a spring arm 58 carried by front plate 3 and engageable between a plurality of gear teeth 54′ cut in the outer side wall of gear wheel 54. Gear 54 has forty-eight teeth on its periphery which engage with spring detent 58. This provides fifteen minute setting increments, so that the start time indicator 15, 16 can be accurately set in selected fifteen minute increments. It should be understood that although the specific embodiment of this invention is disclosed as providing accurate fifteen minute starting time intervals, this invention is also applicable to other timing intervals by merely increasing or decreasing the number of notches on cam 42 and the number of teeth formed on gear 54 and providing other suitable indicia on disc 15.

It can be seen that if the time of drop-off of cam 55 into slot 56 occurs when tab 40 is very close to one or the other of notches 44, 45, 46 or 47, switch actuation might occur fifteen minutes before or fifteen minutes after the time set due to manufacturing eccentricities in the gear train. Hence, provision may be made for adjusting the timing relationship between the fifteen minute cam 42 and the start time cam 54. This is accomplished by making a slight change in the longitudinal position of spring 58 with respect to gear wheel 54. By selecting the proper position for this detent spring, the time of drop-off of the twelve hour cam can be made to occur when tab 40 on the slider is approximately midway between the notches on the fifteen minute cam 42. By thus providing a maximum allowance for manufacturing tolerances, it can be seen that a reliable mechanism is provided.

It can be seen that a unique relationship exists between slider 26 and the start time mechanism. Gear 50 pivots slider about lug 27 and arm 30 to move the bottom portion of slider 26 rearwardly or forwardly. Further, disc 42 lifts the left portion of slider to pivot the slider about lug 27 to disengage latch 35 to allow slider 26 to slide to the left. Thus, a simple flat lever is uniquely designed to have two forms of pivotal motion and a sliding motion imparted to it by the start time mechanism.

*View time mechanism*

From the foregoing description it will appear that the mechanism thus far described will cause the television receiver to be turned on and slider 26 to be moved longitudinally to the left at the time set by the rotary position of start time set dial 15. My improved mechanism for manually turning the television receiver on or off, or setting a particular viewing time interval by use of a single control knob 13 will now be more particularly described. As shown in the left portion of Fig. 9, a manual "off" and "on" device is provided in the form of a cam actuated lever 59 which is pivoted on shaft 62. Lever 59 is provided with an arm 60 for engagement with one side of lug 39 formed on the end of slider 26 for lifting the left end of the slider to disengage latch 35 when arm 60 is moved to the left thereby allowing spring 33 to move slider 26 to the left to close the switch. Lever 59 is also provided with an arm 61 spaced adjacent to arm 60 for engaging the other side of lug 39. When the upper portion of cam lever 59 is moved to the right, arm 61 engages lug 39 to move slider 26 to the right against the force of spring 33 and spring contact 21 to open the switch. Concurrently with this movement, spring 33 pulls the left-hand portion of slider 26 downwardly to engage latch 35 to hold the switch open.

Figure 5:
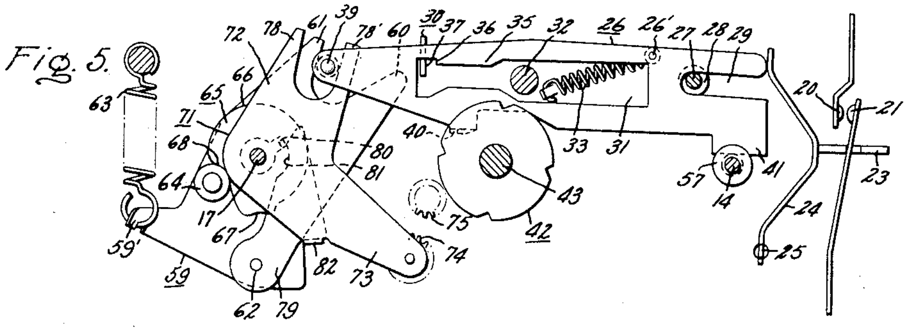
Fig. 5 is a partial front elevation view of the time switch mechanism showing the switch in the manual "off" position.
Figure 6:
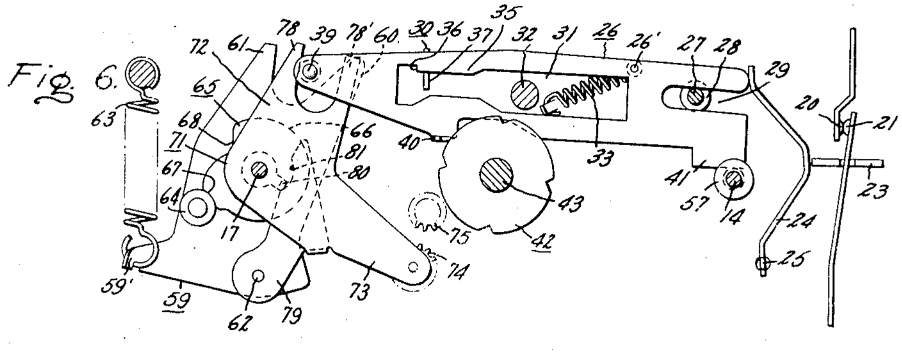
Fig. 6 is a partial front elevation view of the switch mechanism showing the switch in the manual "on" position.

The mechanism for actuating cam lever 59 will now be more particularly described. With particular reference to Figs. 5, 6, and 9, the "on-off" lever 59 is pivoted at 62 to the supporting structure. A relatively strong spring 63 is fixed at one end thereof to the supporting structure and at its other end to a corner 59' of switch actuating lever 59 to urge the top portion of lever 59 to the right as viewed in Fig. 3. A roller 64 is rotatably mounted on lever 59 between corner 59' and arm 61. A cam 65 is provided on shaft 17 for co-operating with roller 64 to pivot and select the position of lever 59 upon rotation of shaft 17. Cam 65 has a plurality of cam surfaces formed thereon at different radial distances from the axis thereof. Thus, when knob 13 is rotated these different cam surfaces allow spring 63 to move roller 64 toward or away from the axis of shaft 17 to thereby pivot lever 59. As shown in Figs. 3 and 4, a cam surface 66 of substantially constant radial distance from the center of the cam is provided for engaging roller 64 when a particular viewing time is set by rotating knob 13. The manner in which cam surface 66 co-operates with other elements of the viewing time mechanism will be more particularly described hereinafter. As shown in Fig. 6, a second cam surface in the form of an "on" detent 67 is spaced at a greater radial distance from the axis of disc 65 than surface 66 and is provided for urging roller 64 and the upper portion of lever 59 to the left as viewed in Fig. 6 against the tension of spring 63 for contacting lug 39 to disengage latch 35 and turn the television receiver on. As viewed in Fig. 5, a third cam surface in the form of an "off" detent 68 is also formed on cam disc 65 and is spaced between detent 67 and cam surface 66. Detent 68 is displaced at a lesser radial distance from the center of disc 65 than surface 66 or detent 67. Thus, when knob 13 is rotated to allow roller 64 to move within detent 68, spring 63 forces roller 64 and the upper portion of lever 59 to the right as viewed in Fig. 5 to allow arm 61 to move to the position shown in Fig. 5 to move slider 26 against the force of spring 33 and the force of resilient contact 21 to open the switch. It should be appreciated that the force of spring 63 is considerably greater than the combined forces of spring 33 and resilient contact 21. As long as roller 64 is in the "off" detent 68, the slider is held in its extreme righthand position so that the start time mechanism cannot trip the switch on.

The viewing time mechanism for maintaining the switch closed and the television receiver on for a preselected adjustable time interval will now be set forth. As previously described, the means for selecting the view time interval comprises a knob 13 fixed to shaft 17. The view time dial wheel 19 and view time cam 65 are also fixed to shaft 17 and are rotated upon actuation of knob 13 to indicate a preselected view time. A resilient friction clutch in the form of view time gear 70 is frictionally coupled to shaft 17 through friction spring 70' and normally rotates together with the shaft. However, when the view time gear is connected to the timing mechanism in a manner to be more fully described hereinafter, this friction clutch slips and allows gear 70 to rotate with the timing mechanism when knob 13 is rotated in an adjusting operation. Thus upon rotation of knob 13 to indicate a particular view time, cam 65 is rotated to position roller 64 at a particular angular position on cam surface 66

Idler gear means is provided for connecting viewing time gear 70 and hence, view time cam 65 to the timing mechanism 8, 10 at the instant the switch is closed and the television receiver is turned on when a particular viewing time interval has been preset. In the arrangement illustrated in Fig. 9, this comprises a pivoted idler gear lever 71 in the form of a substantially flat bell crank having arms 72 and 73 arranged substantially perpendicular to each other. Lever 71 is preferably pivoted on shaft 17. An idler gear 74 is rotatably mounted at the end of arm 73 for selective engagement with a drive pinion 75. Drive pinion 75 may be rotated as a function of time by a timing mechanism including gear 75', pinion 69, gear 69', gear 11 and synchronous motor 8. When the idler gear 74 comes into mesh with drive pinion 75, it causes the viewing time shaft 17 to rotate in a clockwise direction until roller 64 drops into "off" detent 68. The viewing time gear train which accomplishes this can best be seen in Fig. 9. The viewing time gear train consists of a gear 76 and pinion 77 rigidly fixed to each other and rotatably mounted on arm 73 of bell crank lever 71. Gear 76 is in mesh with idler gear 74, and pinion 77 is in mesh with viewing time gear 70. Thus, rotation of idler gear 74 causes corresponding rotation of viewing time gear 70 and cam 65. The frictional coupling between gear 70 and cam 65 through spring 70' and shaft 17 is adequate to transmit the required torque without slipping.

The end of arm 72 of bell crank lever 71 is provided with a U-shaped slot forming forks 78 and 78' for receiving lug 39. Lug 39 which is fixed to slider 26 is positioned for actuation between arms 78 and 78' of bell crank lever 71, and between arms 61 and 60 of lever 59. Thus, when the automatic start time means trips slider 26 to close the switch, lug 39 engages fork 78 to pivot lever 71 about shaft 17, thereby moving idler gear 74 into mesh with drive pinion 75. When the view time gear train rotates cam 65 so that roller 64 drops into the "off" detent 68, or when knob 13 is manually rotated to cause roller 64 to drop into "off" detent 68, arm 61 moves to the right as viewed in Fig. 5 to push lug 39 against fork 78' to thereby pivot idler lever 71 to disengage idler gear 74 from drive pinion 75.

From the foregoing description it will be appreciated that my improved linkage for operatively connecting the switch to the view time mechanism, the start time mechanism including preconditioning means, and the manual "on-off" means comprises only two parts, simple coil spring 33 and slider 26 formed with a plurality of control surfaces including tabs and projections. Slider 26 may be formed in an uncomplicated stamping operation. Thus, an exceedingly simple yet effective movement is obtained.

An interlock mechanism is provided for preventing undesirable locking of the view time gear train to drive pinion 75 when cam 65 is rotated between its "on" and "off" positions. In the arrangement illustrated in Fig. 9, this comprises a simple flat lever 79 pivoted at 62 to the supporting structure. This lever 79 lies between cam 65 and lever 59 and is operatively connected between cam 65 and idler gear lever 71. A small finger 80 is lanced out of cam 65 at a point substantially opposite the "off" detent 68 to engage a curved edge 81 of lever 79. A turned down lip 82 is provided on bell crank lever 71 for engagement with an edge 83 of interlock lever 79. Thus, as cam 65 travels between the "on" and "off" positions as shown in Figs. 5 and 6, finger 80 pushes against edge 81 to pivot lever 79 thereby pushing edge 83 of interlock lever 79 against lip 82 of idler gear lever 71 so as to hold idler gear 74 out of mesh with drive pinion 75. In all other angular positions of cam 65, finger 80 does not engage edge 81 of lever 79. Hence, interlock lever 79 is permitted to rotate far enough counterclockwise to allow the idler gear 75 to come into mesh with pinion 72 when slider 26 is tripped.

In the preferred embodiment shown in Fig. 9, the gear ratio between the viewing time gear 70 and the timing mechanism is such that the viewing time gear is caused to rotate one-half a revolution in two hours when the idler gear 74 is in mesh with drive pinion 75. Since "on" and "off" detent means are provided on viewing time cam 65, this allows approximately three-quarters of the cam to be utilized for viewing time purposes. Hence, as shown on dial 19, viewing time up to three hours may be set by rotating knob 13. The gear ratio between the timing mechanism and the idler gear train may be adjusted to allow the view time mechanism to be rotated faster or slower, thereby providing for time-setting periods of shorter or longer duration.

As shown in Fig. 10, a gearing arrangement is provided for allowing longer time-setting periods to be set. In the arrangement illustrated, idler gear 74 is provided with a smaller gear 84 rigidly fixed thereto and mounted for rotation on the same axis as idler gear 74. Gear 84 has fewer teeth than gear 74. Thus, in the arrangement shown in Fig. 10 when idler gear 74 is moved into mesh with drive pinion 75, gear 76' which is in mesh with gear 84 is caused to rotate at a slower speed than gear 76 shown in Fig. 9. Hence, dial 19 may be calibrated to accommodate longer time-setting periods.

*Automatic start and view time operation*

If, for example, it is desired to have the television receiver come on at some time in the future, say nine o'clock, and stay on for a duration of one hour, after which it will shut off automatically, knob 13 is rotated counterclockwise through the "off" position to the one hour mark as shown in Fig. 9, and the start time knob is rotated until nine o'clock shows opposite the pointer adjacent to starting time aperture 16; either knob may be set first. In rotating knob 13 through the "off" position, roller 64 is allowed to follow the "off" detent. This causes spring 63 to pivot the top portion of lever 59 to the right thereby moving arm 61, lug 39 and slider 26 to the right as viewed in Fig. 9 and Fig. 5. In rotating dial 19 from the "off" position to the one hour mark, cam 65 turns with the viewing time knob 13 and forces roller 64 out of the "off" detent which, in turn, rotates cam lever 59 counterclockwise about pivot 62 to the position shown in Fig. 9 and Fig. 3. In this position the cam lever 59 is no longer exerting force on the slider through arm 61 and lug 39. Thus, slider 26 is now free to move to the left as viewed in Fig. 9. It travels approximately one-sixteenth of an inch to the left at which point latch 35 on the slider engages a side surface 37 of slider support arm 30 and tab 40 is laterally positioned for actuation by cam 42. Although the slight motion has allowed switch contact 21 to move closer toward contact 20, they are still held in the open position shown in Fig. 9.

In setting the start time mechanism to the position shown in Fig. 9, gear wheel 56 is forced axially away from gear wheel 54 to pivot the bottom of slider 26 rearwardly so that tab 40 is not in engagement with fifteen minute cam disc 42 and cannot be actuated thereby.

The start time mechanism can now operate and trip slider 26 into the "on" position shown in Fig. 4 at nine o'clock. The timing device rotates the clock hands toward nine o'clock and at the same time, the clock mechanism rotates cam gear 50 clockwise. Referring now to Fig. 9, when the clock mechanism indicates a few minutes before nine o'clock, the cam portions on gears 54 and 50 come into alignment and projection 55 drops into hole 56. When this happens spring 33 pivots the bottom portion of slider 26 forwardly. At the same time, tab 40 formed on the bottom of slider 26 is also moved forwardly into engagement with accurate fifteen minute timing disc 42. As previously described, detent 58 is adjusted so that this pivoting action of slider 26 occurs somewhere between quarter hour time periods, thus preventing tab 40 from immediately engaging one of notches 44, 45 or 46. Hence, tab 40 engages the side surface of cam 42 at a point intermediate two adjacent notches. The timing mechanism rotates fifteen minute cam 42 clockwise. At a few seconds before nine o'clock, one of the notches 44, 45, 46 or 47 on disc 42 engages tab 40 on the slider and raises the left end of slider 26 as the disc continues to rotate. At nine o'clock, latch 35 on the slider is lifted above side surface 37 of arm 30 to disengage the latch, thus allowing spring 33 to slide slider 26 to the left to the position shown in Fig. 4 to close the switch and start the television receiver. At the same time, stud 39 on the left end of slider 26 engages arm 78 of the idler gear lever 71 rotating it counterclockwise, thus causing the idler gear 74 to come into mesh with drive pinion 75. When the idler gear comes into mesh with drive pinion 75, it causes viewing time shaft 17 and viewing time disc 19 to rotate in a clockwise direction from the one hour preset indication through the zero indication at which time spring 63 forces roller 64 into "off" detent 68. At ten o'clock as roller 64 moves into the "off" position, spring 63 also causes arm 61 to move lug 39 and slider 26 to the right to the position shown in Fig. 5 to thereby open the switch contacts to turn the television receiver off. As lug 39 moves to the right, it engages arm 78' of lever 71, rotating the lever clockwise to disengage idler 74 from gear 75, as shown in Fig. 5.

*Manual on-automatic view time*

If it is desired to manually turn the television receiver on and to have the television receiver remain on for a preselected time interval, view time knob 13 is rotated clockwise in the direction of the arrow on top of viewing aperture 18 through the "on" position to the desired time indicated by the pointer on the left side of viewing aperture 18. When knob 13 is rotated from the "off" position to the "on" position, cam 65 moves roller 64 radially outwardly from shaft 17 to thereby pivot lever 59 against the force of spring 63. This causes arm 60 to lift lug 39 and the left portion of slider 26 to disengage latch 35 as shown in Fig. 6 thereby starting operation of the television receiver. When knob 13 is rotated clockwise from the "on" position to a particular view time setting, roller 64 is positioned at a particular angular position on cam surface 66 corresponding to the view time set on view time dial 19. At the same time, the interlock mechanism 79 is released, thus allowing slider 26, lug 39 and lever 71 under urging of spring 23 to move further to the left and connect the idler gear mechanism for rotation by the timing mechanism as shown in Fig. 4. When the view time mechanism is connected to the drive pinion 75, operation of the timer continues in the same manner as the automatic start and view time operation described above to maintain the television receiver on for the preselected view time interval. The user may change the indicated view time at any time he wishes by merely rotating knob 13 to the desired new setting. If the view time gear train is in mesh, thus preventing gear 70 from rotating, the frictional coupling provided by spring 70' is caused to slip when changing the positions of the view time disc 19 and cam 65.

*Manual operation*

By turning knob 13 clockwise until the word "on" appears opposite the arrow adjacent to window 18, the switch can be closed immediately to start the television receiver and remain in this position until shut off manually. This position of the time switch is shown in Fig. 6. Roller 64 is located in manual "on" detent 67. In this position roller 64 has been raised higher than the position shown in Fig. 5. This causes cam lever 59 to be rotated about pivot 62 slightly further counterclockwise. It can be seen that arm 60 of the cam lever 59 comes up underneath lug 39 on the end of slider 26, causing the slider to rise and unlatch the slider. This allows spring 33 to move slider 26 to the left to the position shown in Fig. 6, thereby closing switch contacts 20 and 21. In the manual "on" position, finger 80 on cam 65 engages interlock lever 79 to pivot the lever downwardly. This causes a bottom surface 82 of the interlock lever 79 to push finger 82 on the idler gear lever downwardly to prevent viewing time idler gear 75 from going into mesh with drive pinion 72. This interlock arrangement can be seen in Fig. 6. The mechanism will remain in the position shown in Fig. 6 until the viewing time knob is rotated either counterclockwise to the "off" position or clockwise into the viewing time position.

By turning the viewing time knob counterclockwise to the "off" position, the switch can be opened. This position of the mechanism is shown in Fig. 5. The roller is shown on the "off" detent 68. In moving from the "on" detent to the "off" dentent, roller 64 allows spring means 63 to pivot cam lever 59 clockwise to the position shown in Fig. 5. In this position, arm 61 of cam lever 59 pushes lug 39 and slider 26 to the right as viewed in Fig. 5 against the force of spring 33 and resilient contact 21 to hold the switch open and maintain the television receiver off. In the manual "off" position, lug 39 bears against arm 78' of lever 71, thus preventing viewing time idler gear 74 from going into mesh with drive pinion 75. Further, in the "off" position a small portion of tab 40 is positioned inside of notches 44, 45, 46 and 47 and this prevents the tab from dropping into any of the notches. Thus, nothing happens to unlatch slider 26 even though cams 55 and 56 become aligned at 12 hour intervals.

It is to be understood within the scope of this invention that various devices other than a switch may, of course, be actuated by the mechanism disclosed. For example, valves, variable condensers, variable resistances, solenoids and other such devices may be actuated by slider 26. It is also to be understood that the timer control set forth above may be used to control devices other than television receivers. The timer could control heating units, electric ranges and air conditioner units, and many other devices. Further, it should be appreciated that my improved start time mechanism may be used in the absence of my improved view time mechanism and vice versa.

While there has been shown and described a particular embodiment of this invention, it will be obvious to those skilled in the art that various other changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. A time switch comprising a timing mechanism, a resilient movable contact biasing the switch to a closed position, a switch actuation slider for moving said movable contact to open said switch, spring means connected to said slider for biasing said slider to one position for moving said movable contact to open said switch, latch means on said slider for locking said slider in said one position to hold said switch open, means driven by said timing mechanism for disengaging said latch means at a preset time, a time gear train for opening said switch, and means for connecting said time gear train to said timing mechanism at the moment when said latch means is disengaged and said switch is closed.

2. A time switch comprising a timing mechanism, a resilient movable contact biasing the switch to a closed position, a longitudinal slider in operative relation with said movable contact, said slider being mounted for longitudinal and pivotal movement, spring means for slidably urging said slider longitudinally away from said switch means in a direction for allowing the movable contact member to close said switch, latch means on said slider for locking said slider in one longitudinal position against the force of said spring means thereby to hold said switch in an open position, a first manually settable means rotated by said timing device to pivot said slider and disengage said latch means to thereby close said switch at a predetermined time, a lug fixed to one end of said slider, and manually operated lever means for moving said lug thereby to open or close said switch.

3. A time switch comprising a timing mechanism, a resilient movable contact biasing the switch to a closed position, a longitudinal slider in operative relation with said movable contact, spring means for slidably urging said slider away from said switch means in a direction for allowing the movable contact member to close said switch, latch means on said slider for locking said slider in one longitudinal position against the force of said spring means to thereby hold said switch in an open position, a first manually settable means rotated by said timing device to disengage said latch means for closing said switch at a predetermined time, a lug fixed to one end of said slider, and manually operated lever means for moving said lug thereby to open or close said switch, a second manually settable means for opening said switch at a predetermined time, said second manually settable means including an idler gear, and lever means operated by said lug means for connecting said idler gear for rotation by said timing device at the moment when said first manually settable means unlatches said latch means.

4. A time switch comprising a timing mechanism, a resilient movable contact biasing the switch to a closed position, a switch actuation slider for moving said movable contact to open said switch, latch means on said slider for locking said slider in one position to hold said switch open, a first timed means driven at one speed by said timing mechanism for disengaging said latch means when said slider is placed in the path of said first timed means, a second timed means driven at a fraction of the speed of said first timed means for pivoting said slider into the path of said first timed means, a time gear train for opening said switch, means for connecting said time gear train to said timing mechanism at the moment when said latch means is disengaged and said switch is closed, and means for manually setting the time for the operation of said second timed means.

5. Timing mechanism for accurately controlling a switch comprising a spring biased slider for actuating said switch, latch means on said slider for normally locking said slider in one position for holding said switch open, first cam means normally spaced from said slider rotatable at a relatively fast speed by said timing mechanism for unlatching said latch means, said slider being mounted for pivotal movement into and out of the path of said first cam means, and second cam means normally in contact with said slider rotatable at a relatively slow speed by said timing mechanism for pivoting said slider into the path of said first cam means, whereby said second cam means preconditions said slider for accurate actuation by said relatively fast-moving cam means to close said switch.

6. In a timing device, a switch and means for closing said switch when open and maintaining it closed for a predetermined adjustable time and opening the same at the end of such time, comprising a first gear continuously rotated by said timing device, a second manually rotatable gear, a cam secured to said second gear to rotate therewith, idler gear means for selectively connecting or disconnecting said first gear to said second gear, said cam having a plurality of angular positions, means for opening said switch when said cam is in one angular position and for closing said switch and selectively connecting said idler gear to said first gear when said cam is in other angular positions, the direction of rotation of said continuously rotating gear being in such a direction as to rotate said manually rotatable gear and cam from said other angular position to said one angular position when said idler gear is connected to said first gear.

7. In a timing mechanism comprising a time switch and a clock having a minute hand driven by said timing mechanism, the improvement comprising a switch actuation slider, spring means for slidably urging the slider in a longitudinal direction for closing the switch, latch means on said slider for locking said slider in one longitudinal position to hold the switch open against the force of the spring means, a first timed means including a cam directly connected to said minute hand shaft for rotation at the same speed thereas for disengaging the latch means said slider being mounted for pivotal movement into and out of the path of said cam, presettable timed means driven at a fraction of the speed of said first timed means by said timing mechanism for allowing said slider to pivot into the path of said first timed means at a preset time.

8. In a timing mechanism comprising a supporting structure, a shaft driven at one revolution per hour by said timing mechanism, a first axially movable cam gear wheel rotatably mounted on said supporting structure and driven at one revolution in twelve hours by said timing mechanism, a second cam gear wheel rotatably mounted on said supporting structure, means for manually adjusting the relative angular position of said first cam gear wheel with respect to said second cam gear wheel, the improvement comprising a disc cam fixed to said shaft, a plurality of cam surfaces located on said disc cam, a slider mounted for longitudinal and pivotal movement on said supporting structure, latch means on said slider for locking said slider in one longitudinal position, spring means fixed at one end to said slider and at the other end to said supporting structure for urging said slider against a side surface of said first cam gear wheel, a tab on said slider positioned for engagement with said disc cam for pivoting said slider to disengage said latch means to thereby allow said slider to move to a second longitudinal position.

9. A time switch comprising a timing mechanism, a resilient movable contact biasing the switch to a closed position, a switch actuation slider for moving said movable contact to open said switch, said slider being mounted for longitudinal and pivotal movement, latch means on said slider for locking said slider in a first longitudinal position to hold said switch open, a first timed means driven at one speed by said timing mechanism for disengaging said latch means at a particular interval of time when said slider is placed in the path of said first timed means to allow said slider to move to a second longitudinal position to close said switch, a second timed means driven at a fraction of the speed of said first timed means for allowing said slider to pivot into the path of said first timed means, and means for manually setting the time for the operation of said second timed means.

10. A time switch comprising a timing mechanism, a resilient movable contact biasing the switch to a closed position, a switch actuation slider for moving said movable contact to open said switch, said slider being mounted for longitudinal and pivotal movement, latch means on said slider for locking said slider in a first longitudinal position to hold said switch open, a first manual means for moving said slider to release said latch means to close said switch, a second manual means for moving said slider to engage said latch means to hold said switch open, a first timed means driven at one speed by said timing mechanism for disengaging said latch means when said slider is placed in the path of said first timed means to allow said slider to move to a second longitudinal position to close said switch, a second timed means driven at a fraction of the speed of said first timed means for pivoting said slider into the path of said first timed means, and means for manually setting the time for the operation of said second timed means.

11. In a timing device, a switch and means for closing said switch when open and maintaining it closed for a predetermined adjustable time and opening the same at the end of such time, comprising a first gear continuously rotated by said timing device, a second manually rotatable gear, a cam secured to said second gear to rotate therewith, a bell crank lever having two arms, an idler gear rotatably mounted on one of the arms of said bell crank lever and spaced from said first gear for selective engagement therewith, a gear train rotatably mounted on said one arm of said bell crank lever for connecting said idler gear to said second manually rotatable gear, automatically timed means co-operating with the other arm of said bell crank lever for moving said idler gear into mesh with said first gear, a cam follower means co-operating with said cam and in operative relation with said switch such that in a first angular position of said cam said switch is open, in a second angular position of said cam said switch is closed, and in still other angular positions of said cam said switch may be opened or closed and the idler gear may be selectively moved into mesh with said first gear when the switch is closed, the direction of rotation of said continuously rotating gear being in such a direction as to rotate said manually rotatable gear and cam from said other angular positions to said one angular position when said idler gear is moved into mesh with said first gear.

12. In a timing device, a switch and means for closing said switch when open and maintaining it closed for a predetermined adjustable time and opening the same at the end of such time, comprising a first gear continuously rotated by said timing device, a second manually rotatable gear, a cam secured to said second gear to rotate therewith, a pivoted bell crank lever having two arms, an idler gear rotatably mounted on one of the arms of said bell crank lever and spaced from said first gear for selective engagement therewith, a gear train rotatably mounted on said one arm of said bell crank lever for connecting said idler gear to said second manually rotatable gear, automatically timed means co-operatnig with the other arm of said bell crank lever for pivoting said bell crank lever thereby to move said idler gear into mesh with said first gear, a cam follower means co-operating with said cam and in operative relation with said switch such that in a first angular position of said cam said switch is open, in a second angular position of said cam said switch is closed, and in still other angular positions of said cam said idler gear may be selectively moved into mesh with said first gear, the direction of rotation of said continuously rotating gear being in such a direction as to rotate said manually rotatable gear and cam from said other angular positions to said first angular position, and an interlock lever positioned between said bell crank lever and said cam for holding said idler gear out of mesh with said first continuously rotated gear when said cam is in said second angular position.

13. In a timing device, a switch and means for automatically closing said switch when open and maintaining it closed for a predetermined adjustable time and opening the same at the end of such time, comprising a resilient movable contact biasing said switch to a closed position, a switch actuation slider for moving said movable contact to open said switch, latch means on said slider for locking said slider in one position to hold said switch open, automatically timed means for disengaging said latch, a first gear continuously rotated by said timing device, a second manually rotatable gear, a cam secured to said second gear to rotate therewith, idler gear means for selectively connecting and disconnecting said first gear to said second gear, a cam follower means co-operating with said cam and in operative relation with said switch actuation slider such that in a first angular position of said cam said switch is open, in a second angular position of said cam said switch is closed, and in still other angular positions of said cam said idler gear means may be selectively moved into mesh with said first gear when said switch is closed, the direction of rotation of said continuously rotating gear being in such a direction as to rotate said manually rotatable gear and cam to said first angular position when said idler gear means is moved into mesh with said first gear.

14. In a timing device, a switch and means for automatically closing said switch when open and maintaining it closed for a predetermined adjustable time and opening the same at the end of such time, comprising a resilient movable contact biasing said switch to a closed position, a switch actuation slider for moving said movable contact to open said switch, latch means on said slider for locking the slider in one position to hold said switch open, automatically timed means for disengaging said latch, a first gear continuously rotated by said timing device, a second manually rotatable gear, a cam secured to said second gear to rotate therewith, idler gear means for selectively connecting said first gear to said second gear, a pivoted cam follower lever, a roller rotatably mounted on said lever for contacting said cam, spring means connected to said cam follower lever for continuously urging said roller into contact with said cam, said cam follower lever co-operating with said cam and in operative relation with said switch actuation slider such that in a first angular position of said cam said switch is open, in a second angular position of said cam said switch is closed, and in still other angular positions of said cam said idler gear means may be selectively moved into mesh with said first gear, the direction of rotation of said continuously rotating gear being in such a direction as to rotate said manually rotatable gear and cam to said first angular position when said idler gear means is moved into mesh with said first gear.

15. In a timing mechanism comprising a supporting structure, a switch, said switch including a resilient movable contact biasing the switch to a closed position, a switch actuation slider for moving said movable contact to open said switch, latch means on said slider for locking said slider in one longitudinal position to hold said switch open, manual means for moving said slider to release said latch means to close said switch and for moving said slider to engage said latch means to hold said switch open, a first centrally located timing means driven at one speed by said timing mechanism, said slider also being mounted on said supporting structure for pivotal movement into and out of the path of said first timed means, said first timed means including means for disengaging said latch means when said slider is placed in the path of said first timed means, a second timed means driven at a fraction of the speed of said first timed means for pivoting said slider into the path of said first timed means, a minute hand fixed to said first timed means, said second timed means including means for manually presetting the time for the operation of said second timed means, and dial means fixed to said means for manually presetting the time for the operation of said second timed means.

16. A timing mechanism comprising a rectangular supporting structure, a centrally located shaft driven at one revolution per hour by said timing mechanism, a first axially movable cam gear wheel rotatably mounted on one side of said rectangular supporting structure and driven at one revolution in twelve hours by said timing mechanism, a second cam gear wheel rotatably mounted on said supporting structure in coaxial relationship with said first cam gear wheel, means for manually adjusting the relative angular position of said second cam gear wheel with respect to said supporting structure, dial means fixed to said second cam gear wheel for visually indicating the relative angular position of said second cam gear wheel with respect to said supporting structure to thereby indicate a preset start time, a disc cam fixed to said shaft, four cam surfaces located on said disc cam to provide accurate camming action at fifteen minute intervals, a switch, said switch including a resilient movable contact member biasing said switch to a closed position, a longitudinal slider in operative relation with said movable contact, spring means fixed at one end to said slider and at the other end to said supporting structure for pivotally urging said slider against a side surface of said first cam gear wheel and for slidably urging said slider away from said switch means in a direction for allowing the movable contact member to close said switch, latch means on said slider for locking said slider in one longitudinal position against the tension of said spring means to thereby hold said switch in an open position, and a tab on said slider arranged for selective engagement with said cam disc for disengaging said latch means to thereby close said switch, whereby axial movement of said first cam gear wheel towards said second cam gear wheel at approximately said preset time pivots said slider, thereby moving said tab on said slider into engagement with said cam disc to permit one of the cams on said cam disc to disengage said latch means thereby to close said switch at said exact preset fifteen minute interval.

17. A timing mechanism comprising a rectangular supporting structure, a centrally located shaft driven at one revolution per hour by said timing mechanism, a first axially movable cam gear wheel rotatably mounted on one side of said rectangular supporting structure and driven at one revolution in twelve hours by said timing mechanism, a second cam gear wheel rotatably mounted on said supporting structure in coaxial relationship with said first cam gear wheel, means for manually adjusting the relative angular position of said second cam gear wheel with respect to said first cam gear wheel, dial means fixed to said second cam gear wheel for visually indicating the relative angular position of said second cam gear wheel with respect to said first cam gear wheel thereby to indicate a preset start time, a spring detent fixed to said supporting structure, said detent being engageable between the teeth of said second cam gear wheel, means for adjusting the position of said spring detent with respect to said supporting structure, a disc cam fixed to said shaft, four cam surfaces located on said disc cam to provide accurate camming action at fifteen minute intervals, a switch, said switch including a resilient movable contact member biasing said switch to a closed position, a longitudinal slider in operative relation with said movable contact, spring means fixed at one end to said slider and at the other end to said supporting structure for pivotally urging said slider against a side surface of said first cam gear wheel and for slidably urging said slider away from said switch means in a direction for allowing the movable contact member to close said switch, latch means on said slider for locking said slider in one longitudinal position against the tension of said spring means to thereby hold said switch in an open position, and a tab on said slider arranged for selective engagement with said cam disc for disengaging said latch means to thereby close said switch, whereby axial movement of said first cam gear wheel toward said second cam gear wheel at approximately said preset time pivots said slider, thereby moving said tab on said slider into engagement with said cam disc to permit one of the cams on said cam disc to disengage said latch means thereby to close said switch at said exact preset fifteen minute interval.

18. A time switch comprising a timing mechanism, a longitudinal slider for operating said switch, cam means driven at relatively high rotational speed by the timing mechanism, a presettable means driven at a fraction of the speed of said cam means for allowing said slider to pivot into the path of said cam means, spring means fixed at one end thereof to said slider for pivotly urging said slider toward said cam means and for longitudinally urging said slider in a direction for closing said switch, latch means on said slider for locking said slider in one longitudinal position against the force of said spring means to thereby hold the switch in an open position, and means on the slider arranged for selective engagement with said cam for disengaging said latch means to thereby close said switch.

19. In a timing device, a switch and means for closing said switch at a predetermined time when open and maintaining it closed for a predetermined adjustable time, comprising a first manually presettable means continuously operated by said timing device for closing said switch at a predetermined time, a second manually presettable means for maintaining said switch closed for a preselected adjustable time interval, said second manually presettable means being normally spaced from said timing device and stopped with respect to said first manually presettable means and said timing device, said second manually presettable means being manually adjustable independently of said first manually presettable means, said second manually presettable means including an idler gear normally spaced from said timing device, and automatic means for moving said idler gear into engagement with said timing device for rotation thereby at the moment when the first manually presettable means closes said switch to maintain said switch closed during the time interval manually set by said second manually presettable means.

References Cited in the file of this patent

UNITED STATES PATENTS

| | | |
|---|---|---|
| 1,851,592 | Paschen et al. | Mar. 29, 1932 |
| 1,926,190 | Borden | Sept. 12, 1933 |
| 2,096,620 | Robertson | Oct. 19, 1937 |
| 2,182,894 | Hammell | Dec. 12, 1939 |
| 2,200,110 | Andersen | May 7, 1940 |
| 2,870,834 | Sisson | Jan. 27, 1959 |

FOREIGN PATENTS

| | | |
|---|---|---|
| 298,955 | Switzerland | Aug. 2, 1954 |
| 998,692 | France | Sept. 26, 1951 |